United States Patent [19]

Hayashida et al.

[11] Patent Number: 5,403,483
[45] Date of Patent: Apr. 4, 1995

[54] HYDROPHOBIC POROUS MEMBRANES AND PROCESS FOR THE MANUFACTURE THEREOF

[75] Inventors: Kazuaki Hayashida, Otake; Takao Miyamori, Toyama; Jun Kamo, Otake, all of Japan

[73] Assignee: Mitsubishi Rayon Co., Ltd., Tokyo, Japan

[21] Appl. No.: 94,981

[22] Filed: Jul. 22, 1993

[30] Foreign Application Priority Data

Jul. 22, 1992 [JP] Japan ............................ 4-195649
Aug. 14, 1992 [JP] Japan ............................ 4-217035

[51] Int. Cl.$^6$ .............................. B01D 29/00
[52] U.S. Cl. ..................... 210/490; 210/500.35; 210/500.36; 210/506; 427/245; 427/393.5; 264/45.1; 264/45.5; 521/31; 521/53
[58] Field of Search ............ 210/500.27, 500.35, 210/500.36, 490, 500.34, 506; 428/315.7, 398; 521/54, 134, 137, 27, 31, 53; 204/252; 427/393.5, 245; 264/45.1, 45.5

[56] References Cited

U.S. PATENT DOCUMENTS

| | | |
|---|---|---|
| 4,055,696 | 10/1977 | Kamada et al. |
| 4,217,198 | 8/1980 | Kadija et al. |
| 4,618,533 | 10/1986 | Steuck ............................ 427/245 |
| 4,695,592 | 9/1987 | Itoh et al. |
| 4,917,793 | 4/1990 | Pitt et al. ....................... 210/500.35 |
| 4,941,792 | 7/1990 | Kau et al. ....................... 210/500.36 |
| 4,954,256 | 9/1990 | Degen et al. |
| 4,961,853 | 10/1990 | Itoh et al. |
| 4,964,991 | 10/1990 | Seita et al. ..................... 210/500.36 |
| 5,102,552 | 4/1992 | Callahan et al. ............... 210/500.35 |
| 5,232,600 | 8/1993 | Degen et al. ................... 210/490 |
| 5,232,642 | 8/1993 | Kamo et al. .................... 264/41 |
| 5,286,382 | 2/1994 | Scarmoutzos et al. ......... 210/490 |

FOREIGN PATENT DOCUMENTS

| | | |
|---|---|---|
| 0183989 | 6/1986 | European Pat. Off. |
| 0398601 | 11/1990 | European Pat. Off. |
| 2608452 | 6/1988 | France |
| 57-42919 | 3/1982 | Japan |
| WO91/01791 | 2/1991 | WIPO |

OTHER PUBLICATIONS

Database WPI, Derwent Publications Ltd., AN-87-353185, JP-A-62 257 844, Nov. 10, 1987.

Primary Examiner—Robert A. Dawson
Assistant Examiner—Ana M. Fortuna
Attorney, Agent, or Firm—Oblon, Spivak, McClelland, Maier, & Neustadt

[57] ABSTRACT

Disclosed is a hydrophobic porous membrane with a polymer having fluorinated alkyl side chains held in physical contact with the surface of a polyolefin porous membrane in which the fluorinated alkyl side chains of the polymer are crystallized, as well as its manufacturing process. Also disclosed is a hydrophobic porous membrane with a fluorinated crosslinked polymer from a fluorinated monomer with a fluorinated alkyl side chain and a crosslinking monomer held in physical contact with the surface of a polyolefin porous membrane, in which the fluorinated alkyl side chains of the fluorinated crosslinked polymer are crystallized, as well as its manufacturing process. These porous membranes use polyolefin porous membranes having a higher mechanical strength and lower costs than the fluorinated polymer porous membranes and still provide superior hydrophobicity over polytetrafluoroethylene type membranes.

21 Claims, No Drawings

HYDROPHOBIC POROUS MEMBRANES AND PROCESS FOR THE MANUFACTURE THEREOF

BACKGROUND OF THE INVENTION

1. Field of the Invention

The present invention relates to highly hydrophobic porous membranes for use in air filters for removal of oil mists, porous membranes for deaerating liquids, water-vapor permeable hydrophobic porous membranes used in a low-temperature heat storage system based on differential aqueous solution concentration and dilution, membranes for use in a gas-liquid separation of highly basic solvents, such as diaminoethanol and monoaminoethanol used to absorb polar gases, such as $CO_2$, $SO_2$, and $H_2S$, and membrane distillation of highly corrosive liquids, and the like.

2. Description of the Related Art

Hydrophobic porous membranes are expected to find applications in the fields of gas-liquid separation by taking advantage of their hydrophobicity.

Hydrophobic porous membranes having excellent mechanical strength for use in these applications are known, which include porous membranes made of polyolefins, such as polyethylene and polypropylene, and more hydrophobic porous membranes which are made of fluorinated polymers, such as polytetrafluoroethylene and polyvinylidene fluoride.

Porous membranes made of polyolefins, such as polyethylene, which are known to be inexpensive and available in many varieties, are, however, insufficiently hydrophobic, for example, as water-vapor permeable hydrophobic porous membranes for use in a low-temperature heat storage system based on differential aqueous solution concentration and dilution, for which more hydrophobic porous membranes are desired. Porous membranes made of polytetrafluoroethylene or polyvinylidene fluoride are known to be more hydrophobic porous membranes. However, such membranes also find limited applications because their wettability with a solution having a surface tention of 28 mN/m or lower prevents their use in a gas-liquid separation of lower surface tension liquids; they exhibit lower mechanical strength compared to polyolefin porous membranes; and they are also expensive.

A hydrophobic porous membrane is known as a means to solve the above problems in which the hydrophobicity is enhanced by a process described in U.S. Pat. No. 4,954,256 which calls for exposing the pore surfaces of a porous membrane to gamma-rays, and graft polymerizing onto the porous membrane surface a highly hydrophobic fluorinated polymer, thereby, bonding it chemically to the membrane. However, this patent teaches nothing about crystallization of fluorinated alkyl side chains on the fluorinated polymer.

According to studies conducted by the present inventors, it was noted that the process which uses gamma rays for grafting is suitable for treating a readily graftable and relatively radiation-stable porous membrane with substrate, such as polyvinylidene fluoride, but grafting onto a porous membrane, particularly a polyolefin type tends to degrade the membrane substrate, resulting in decreased membrane mechanical strength. It was also noted that the process, when applied to a hollow membrane, results in a membrane with a different degree of hydrophobicity between the external and internal surfaces and it is difficult to make the internal surfaces hydrophobic.

Methods are also known to functionalize the surface of a porous membrane so as to improve hydrophilicity, heat resistance, or other properties, which involve holding a reactive monomer on the surface of a porous membrane and polymerizing it in situ as, for example, is disclosed in U.S. Pat. No. 4,695,592 and U.S. Pat. No. 4,961,853; however, these methods teach neither the use of reactive monomers that permit the crystallization of side chains nor any method for crystallizing the side chains. These methods, which call for holding a reactive monomer on the surface of a porous membrane and polymerizing it in situ, can hold a functional polymer uniformly reaching even the interior of the pores without any reduction in mechanical strength caused by degrading the porous membrane. The inventors studied these methods, whereby a highly hydrophobic fluorinated monomer was held on a polyethylene hollow fiber membrane and polymerized as a way as to improve hydrophobicity. However, it was noted that although the fluorinated polymer can be relatively uniformly applied to the pore surface, thereby improving hydrophobicity over the starting polyethylene hollow fiber membrane, the resultant hydrophobicity is not better than that of polytetrafluoroethylene. This may be because the fluorinated alkyl side chains of the fluorinated polymer are not crystallized.

For the foregoing reasons, there is a need for a polyolefin porous membrane which exhibits higher mechanical strength than a porous membrane based on a fluorinated polymer, such as polytetrafluoroethylene or polyvinylidene fluoride, which is a low cost substrate, and which has superior hydrophobicity compared to that of polytetrafluoroethylene membranes.

SUMMARY OF THE INVENTION

It is an objective of this invention to provide a porous membrane made of a polyolefin substrate which has higher mechanical strength than that of a porous membrane from a fluorinated polymer substrate, such as polytetrafluoroethylene or polyvinylidene fluoride, and which is low in cost, but which has superior hydrophobicity compared to that of a polytetrafluoroethylene membrane.

In one aspect of this invention, there is thus provided a hydrophobic porous membrane wherein a polymer having fluorinated alkyl side chains is held in physical contact with the surface of a polyolefin porous membrane and the polymer has fluorinated alkyl side chains which are crystallized. The crystallization of the fluoroalkyl side chains enhances hydrophobicity over the levels currently available. In another aspect of this invention, there is also provided a process for the manufacture of a hydrophobic porous membrane, which comprises the steps of holding a polymer having fluorinated alkyl side chains in physical contact with the surface of a polyolefin porous membrane and heat treating it, thereby crystallizing the fluorinated alkyl side chains.

In still another aspect of the present invention, there is further provided a hydrophobic porous membrane in which a fluorinated crosslinked polymer composed of a fluorinated monomer having a fluorinated alkyl side chain and a crosslinking monomer, is held in physical contact with the surface of a polyolefin porous membrane and the fluorinated alkyl side chains of the fluorinated crosslinked polymer are crystallized. The resultant membranes are more hydrophobic than previously attainable and also more solvent resistant.

In a further aspect of the present invention, there is provided a process for the manufacture of a hydrophobic porous membrane, which comprises the steps of holding a fluorinated crosslinked polymer, composed of a fluorinated monomer having a fluorinated alkyl side chain and a crosslinking monomer, in physical contact with the surface of a polyolefin porous membrane, and heat treating it, thereby crystallizing the fluorinated alkyl side chains.

DESCRIPTION OF THE PREFERRED EMBODIMENTS

The starting polyolefin porous membranes in the present invention may have any form, such as hollow fiber membranes, flat membranes, woven membranes, nonwoven membranes, or tubular membranes, and may have various pore sizes depending upon the need. Preferred examples include those membranes having a membrane thickness of about 20–200 μm, a porosity of about 20–90%, a gas flux of 500–5,000,000 l/m². hr at 0.5 kg/cm², and a pore size of about 0.01–10 μm. Any pore size within the above range may be selected. However, for an application, such as a gas-liquid separation of a high boiling solvent, a membrane with a relatively large pore size, such as 0.3–2.0 μm is preferred, because the liquid tends to condense in the interior of the pores with a particularly greater tendency in the case of a high boiling liquid. The materials forming the polyolefin porous membrane include polyethylene, polypropylene, poly-4-methylpentene-1, and the like.

The present invention may use polyolefin porous membranes with any pore structures, preferably a polyolefin porous membrane with a slit-like pore structure obtained by stretching because of the ease of controlling porosity and pore size. The porous membranes prepared by the stretching method are those having a pore structure in which minute slit-like spaces formed by microfibriles and nodes communicate with each other three-dimensionally, and these membranes may be obtained by processes, for example, as those disclosed in U.S. Pat. No. 4,055,696 and Japanese Patent Laid-Open No. 57-42919 (1982).

The term "polymers having fluorinated alkyl side chains" (hereafter shortened to "fluorinated polymers"), as referred to in this invention, means any fluorinated polymer which is more hydrophobic than a hydrophobic porous membrane material such as polyethylene or polypropylene, and which has a contact angle with water which is greater than that of the polyethylene or polypropylene, and is at least 100°, preferably at least 110°. For ease of polymerization polymers from fluorinated monomers represented by the following structural formula are favored, in particular, those in which the number of carbon atoms in the ester moiety of the fluorinated alkyl side chain is at least 5, in order to allow the fluorinated alkyl side chains to crystallize and to improve hydrophobicity. In particular, consideration of the monomer reactivity and the resultant polymer's hydrophobicity indicates a particular preference for polymers from perfluoroalkylethyl methacrylates or perfluoroalkylethyl acrylates, with their ester moiety containing at least 7, but not more than 15, carbon atoms.

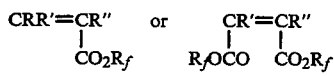

[in the formula,
R=H or F
R'=H, F, or CH$_3$
R"=H, F, CH$_3$, or CF$_3$
R$_f$=CH$_2$CH$_2$(CF$_2$)$_n$CF$_2$R where (n=4–12, R=H or F),
CH$_2$CH$_2$(CF$_2$)$_n$CR(CF$_3$)$_2$ where (n=2–10, R=H or F),
CH$_2$(CF$_2$)$_n$CF$_2$R where (n=5–13, R=H or F), or
CH$_2$(CF$_2$)$_n$CR(CF$_3$)$_2$ where (n=3–11, R=H or F)].

The fluorinated polymer in this invention may be a copolymer of two or more fluorinated monomers or with other reactive monomers, or else a fluorinated crosslinked polymer prepared with a crosslinking monomer. The fluorinated polymer may contain, within the range of not adversely affecting its hydrophobicity, known additives, such as a stabilizer and other polymers.

For use in a gas-liquid separation of a strongly basic solvents, such as diaminoethanol and monoaminoethanol used for absorbing polar gases, such as CO$_2$, SO$_2$, and H$_2$S, or for membrane distillation of a highly corrosive liquid, it is preferred to convert the fluoropolymer into a fluorinated crosslinked polymer by the use of a fluorinated monomer with a crosslinking monomer, which improves chemical stability. Such crosslinking monomers are polyfunctional methacrylates and polyfunctional acrylates, such as dimethacrylates and diacrylates, such as ethylene glycol di(meth)acrylate, 1,3-butylene glycol di(meth)acrylate, glycerin di(meth)acrylate, 1,6-hexane diol di(meth)acrylate, and 1,4-butylene diol di(meth)acrylate; trimethacrylates and triacrylates, such as trimethylol propane tri(meth)acrylate, and pentaerythritol tri(meth)acrylate; tetramethacrylates and tetraacrylates, such as pentacrythritol tetra(meth)acrylates, and the like. Bifunctional vinyl compounds, such as 1,6-divinylperfluoro-n-hexane, are also included. It is preferred to use a crosslinking monomer having a perfluorinated side chain, so as not to lower the hydrophobicity, such as 2,2,3,3,4,4-hexafluoropentane diol di(meth)acrylate, and the like. The crosslinking monomer may be used singly or as a mixture of two or more types.

The ratio of the crosslinking monomer with respect to the fluorinated monomer is not particularly limited, although this depends upon the types of monomers, as long as the ratio is within a range of not adversely affecting the above hydrophobicity. However, the stability of a given membrane in a solvent is improved with a higher crosslinking monomer ratio. It is also preferred to increase the ratio of the fluorinated monomer for achieving improved hydrophobicity. For example, preferred ratios of the crosslinking monomer are about 0.01–20% by weight, preferably about 0.1–5% by weight of the monomer. The fluorinated crosslinked polymer may contain, to the extent of not adversely affecting hydrophobicity, known additives such as stabilizers and other polymers.

The required amount of the fluorinated polymer or fluorinated crosslinked polymer which is held in physical contact with the surface of the starting polyolefin porous membrane in this invention varies, depending upon the porosity or pore size of the polyolefin porous membrane, and is about 1–70 parts by weight, preferably 4–50 parts by weight per weight of the polyolefin porous membrane, for maintaining good membrane performance and exhibiting hydrophobicity, The term "the surface of the polyolefin porous membrane" referred to in this invention means any portion including both external wall surfaces as well as pore interior surfaces of the polyolefin porous membrane, and the present invention requires the fluorinated polymer to be held in physical contact with at least part of the surface of the polyolefin porous membrane. In order to prepare a highly hydrophobic membrane, it is preferred to hold the fluorinated polymer as uniformly as possible on the entire surfaces of the polyolefin porous membrane, preferably holding the fluorinated polymer in an amount equal to at least 80% of the surfaces of the polyolefin porous membrane.

By the term "holding," it is meant keeping the fluorinated polymer in close contact with the porous membrane to the extent of preventing the polymer from readily sloughing off the membrane during storage or during use, including, for example, being kept in contact with the porous membrane substrate by an anchoring effect.

The expression "that the fluorinated alkyl side chains of a fluorinated polymer or fluorinated crosslinked polymer are crystallized" means that at least some of the fluorinated alkyl side chains are crystallized, to the extent of improving the surface hydrophobicity of the polyolefin porous membrane. The expression does not necessarily mean that all of the fluorinated alkyl side chains are crystallized. Any extent of crystallization is acceptable as long as the endotherm at the melting point (Tm) of the fluorinated alkyl side chains of the fluorinated polymer or fluorinated crosslinked polymer held on its membrane surface, as measured thermally by such means as DSC, is at least 0.5 cal/g per g of the fluorinated polymer.

The term "hydrophobic porous membrane" referred to in this invention means a porous membrane having a surface tension below 28 mN/m, preferably a porous membrane having an actual surface tension lower than 25 mN/m in that the surface of the porous membrane is not colored two seconds after coated with a solution of 0.03% by weight of Victoria Pure Blue-BO in 1-butanol (surface tension 25 mN/m), the surface essentially repelling the solution, thereby exhibiting the hydrophobicity of the porous membrane as would be practically shown during its usage.

A description of the process for the manufacture of hydrophobic porous membranes of this invention is given below.

A number of processes may be used to hold a fluorinated polymer or fluorinated crosslinked polymer in physical contact with the surface of a polyolefin porous membrane. For example, a process may be used in which a fluorinated monomer or a fluorinated monomer and a crosslinking monomer are held in physical contact with the surface of a polyolefin porous membrane followed by polymerization in situ; and a process may be used in which a fluorinated polymer or a "fluorinated crosslinked polymer" is dissolved [or dispersed] in a suitable solvent and the resultant solution [or dispersion] is used for dipping a polyolefin porous membrane, followed by vaporizing off the solvent so as to essentially uniformly adhere the fluorinated polymer or the fluorinated crosslinked polymer over the entire surface of the polyolefin porous membrane.

Specifically, a process may be used in which a fluorinated monomer or a fluorinated monomer and a crosslinking monomer together with a polymerization initiator are dissolved in a suitable solvent to prepare a solution, with which the porous polyolefin membrane is impregnated by dipping in the solution, or by fabricating a module from the polyolefin porous membrane, followed by pressurizing the solution into the polyolefin porous membrane; and the solvent is vaporized off. Use of a solution diluted with a solvent will permit essentially uniformly adhering the fluorinated monomer to the entire surface of the polyolefin porous membrane without blocking the pores of the polyolefin porous membrane. In addition, varying the concentration of the fluorinated monomer or the crosslinking monomer in the solution or varying the dipping time can adjust the amount of the fluorinated monomer or fluorinated monomer and crosslinking monomer to be held thereon.

The solvents used for preparing the above solutions are organic solvents that have boiling points lower than either the fluorinated monomer or the crosslinking monomer and which are capable of dissolving the fluorinated monomer or crosslinking monomer, preferably those which also can dissolve the polymerization initiator. Such solvents are, for example: alcohols such as methanol, ethanol, propanol, and isopropanol; and ketones, such as acetone, methyl ethyl ketone, methyl isobutyl ketone; ethers, such as diethyl ether, tetrahydrofuran, and dioxane; chloroform, ethyl acetate, hexane, and the like.

The boiling point of the organic solvent, which is not particularly limited, is preferably not higher than about 100° C., more particularly not higher than 80° C., in view of the case of solvent removal before the polymerization steps.

The compositions of the fluorinated monomer and the crosslinking monomer along with the solvent in the solution should be suitably selected in view of the type of solvent and the amount of the fluoropolymer being held on the membrane, which are preferably about 1–50% by weight per 100% by weight of the solvent.

The dipping time or the pressure-penetration time for dipping or pressure penetrating the polyolefin porous membrane with these solutions is preferably about 0.5 seconds–30 minutes. The operation can be carried out within a suitably shorter period of time when the solvent used has better wetting characteristics toward the polyolefin porous membrane.

The resultant polyolefin porous membrane with the fluorinated monomer or fluorinated monomer and crosslinking monomer and also the polymerization initiator adhering to the surface of the polyolefin porous membrane is then freed of any excess liquid, optionally followed by vaporizing off the solvent from the interior of the pores before the next polymerization step.

The present invention may use polymerization methods such as thermal polymerization, photopolymerization, and the like, and may use a known polymerization initiator. The thermal polymerization should be carried out at a polymerization temperature equal to or greater than the decomposition temperature of the polymerization initiator, preferably at a temperature low enough so as to not change the structure of the porous membrane or damage the membrane substrate, preferably at temperatures of about 30°–100° C. The heating time, which depends on the type of polymerization initiator and heating temperature, is preferably about 10 seconds to 60 minutes.

The polymerization of the fluorinated monomer adhering to the surface of the polyolefin porous membrane by these methods will result in covering the surface of the polyolefin porous membrane with a fluorinated polymer or crosslinked fluorinated polymer. Following the formation of a fluorinated polymer, unwanted components, such as the unreacted monomer or free polymer present on the polyolefin porous membrane surface, may be removed by dipping in or pressure penetration with a suitable rinsing solvent as needed; for example, solvents which are capable of dissolving the monomers, but not the polymer and which are easy to dry; such as alcohols, such as methanol, ethanol, propanol, and isopropanol, ketones; such as acetone, methyl ethyl ketone and isobutyl ketone; ethers, such as diethyl ether, tetrahydrofuran and dioxane; chloroform; ethyl acetate; hexane; and the like). The product as obtained, although exhibiting better hydrophobicity than the starting polyethylene hollow fiber membrane itself, still will not have satisfactory hydrophobicity, not to the extent of exceeding polytetrafluoroethylene.

A description will next be made of the most important step in this process, the method of crystallizing the fluorinated alkyl side chains of the fluorinated polymer or fluorinated crosslinked polymer held on the membrane surface. A variety of methods may be used for crystallizing the fluorinated alkyl side chains, including a heat treatment process. The term "heat treatment" referred to here means not only treating a membrane to dry off the solvent used for rinsing, but also keep in a membrane with a fluorinated polymer held on the membrane surface at high temperatures for a given period of time, thereby crystallizing the fluorinated alkyl side chains: the process comprises keeping the membrane at high temperatures in air, an inert gas such as a nitrogen atmosphere, or in a low surface energy liquid. The medium is not necessarily limiting, but it is preferred to hold the membrane at high temperatures in a gas, which would make it easier to maintain uniform conditions reaching as far as the interior of the pores.

The temperature at which the heat treatment is carried out should be any temperature lower than the Tm of the fluorinated polymer or fluorinated crosslinked polymer, preferably a temperature higher than the glass transition temperature (Tg) of the fluorinated polymer or fluorinated crosslinked polymer, particularly a temperature 5°–20° C. lower than Tm, so as to facilitate crystallization. The heat treatment may be carried out simultaneously with or separate from the step of drying off of the rinsing solvent, or else a multistage heat treatment may be carried out over two or more different temperatures. The heat treatment time, which differs depending upon the heat treatment temperature and the type of fluorinated polymer or fluorinated crosslinked polymer, should be about 1 minute–170 hours, preferably about 5 minutes–48 hours. There is no particular limitation as to the method of cooling after heat treatment, but it is preferred to cool the membrane slowly to promote crystallization.

The reason for improved hydrophobicity by the heat treatment of this invention, which is not completely understood, may be speculated as follows. It may be possible that the crystallization of the fluorinated alkyl side chains on the membrane surface occurs with the fluorinated alkyl side chains orienting toward the ambient gas, a side of a lower surface tension than that of the membrane substrate itself. This results in a predominant distribution, over the membrane surface, the end groups of low surface tension fluorinated alkyl groups, such as trifluoromethyl and difluoromethyl. Thus, the porous membrane may conceivably improve in hydrophobicity after crystallization.

The present invention provides a hydrophobic porous membrane in which a polymer having fluorinated alkyl side chains is held in physical contact with the polyolefin porous membrane, and the fluoroalkyl side chains are crystallized, exhibits improved hydrophobicity performance compared to porous membranes prepared from fluorinated polymers, such as polytetrafluoroethylene or polyolefin, such as polyethylene.

The invention also provides a hydrophobic porous membrane, in which a fluorinated crosslinked polymer from a fluorinated monomer having a fluorinated alkyl side chain and a crosslinking monomer is held in physical contact with the surface of the polyolefin porous membrane and the fluorinated alkyl side chains are crystallized, also exhibits improved hydrophobicity and improved solvent resistance compared to porous membranes made of substrate fluorinated polymers, such as polytetrafluoroethylene or polyolefins, such as polyethylene.

By taking advantage of their hydrophobicity, it should be possible to apply porous membranes of this invention to areas is such as air filters for removal of oil mists, porous membranes for deaerating liquids, water-vapor permeable hydrophobic porous membranes used in a low-temperature heat storage system based on differential aqueous solution concentration and dilution, membranes for use in a gas-liquid separation of highly basic solvents, such as diaminoethanol and monoaminoethanol used to absorb polar gases, such as $CO_2$, $SO_2$, and $H_2S$, and membrane distillation of highly corrosive liquids, and the like.

EXAMPLES

The present invention will hereinafter be described specifically by the following Examples. Porous membranes obtained in each of these Examples and Control Examples were evaluated by the following methods:

(1) Amount of Fluorinated Polymer or Fluorinated Crosslinked Polymer Held on the Membrane: This is measured by the difference in weight of a polyolefin porous membrane before and after holding a fluorinated polymer or fluorinated crosslinked polymer in contact therewith.

(2) Dye Test With Wettability Index Standard Solution No. 31: The surface of a porous membrane is coated with a wetness index standard solution No. 31 (surface tension of 31 mN/m) in 0.5 seconds and is observed two seconds later as to whether the surface reveals coloration or repels the wetness index standard solution. Non-coloration means that the porous membrane has a surface tension lower than 31 mN/m.

(3) Dye Test With 1-Butanol: The surface of a porous membrane is coated with a 0.03% by weight (surface tension of 25 mN/m) solution of Victoria Pure Blue-BO in 1-butanol in 0.5 seconds is observed two seconds later as to whether the surface reveals coloration or repels the solution. Non-coloration means that the surface tension of the porous membrane is lower than 25 mN/m.

(4) Solution Penetration Pressure: A solution comprising 60 parts by weight of deionized water and 40 parts by weight of ethanol (a surface tension of 30 mN/m at 25° C.) is forced under pressure to permeate through the inside of a hollow fiber membrane. The pressure at which the solution begins to permeate through from the entire porous membrane surface is measured and defined as the solution penetration pressure.

(5) Measurement of Endotherm at Tm: A porous membrane is subjected to a DSC thermal analysis to measure the endotherm at Tm, per g of the fluorinated polymer or fluorinated crosslinked polymer.

Example 1

A polyethylene porous hollow fiber membrane EHF (a product of Mitsubishi Rayon Co., Ltd.), having an i.d. of 270 μm, a membrane thickness of 79 μm, a bubble point of 3.8 kg/cm$^2$, a gas flux of 150,000 l/m$^2$·hr at 0.5 kg/cm$^2$, and a porosity of 63% was used as a polyolefin porous membrane component and was dipped for about 15 seconds in a solution of 15 parts by weight of a fluorinated monomer, 2-(perfluorooctyl)ethyl methacrylate (Daikin Industries, Ltd.), 0.15 parts by weight of a polymerization initiator V-70 (Wako Pure Chemical Industries, Ltd), and 85 parts by weight of acetone; and this is then followed by removing the acetone in a nitrogen gas environment at 45° C., polymerizing the fluorinated monomer in a nitrogen gas atmosphere at 80° C., rinsing the membrane with acetone to remove undesired components and, and drying at room temperature. The membrane was then heat treated for 24 hours in air at 80° C. and was brought back to an environment of room temperature and was allowed to stand.

The resultant hydrophobic porous membrane was evaluated in terms of the amount of fluorinated polymer held onto the hydrophobic porous membrane, the dye test with the wet index standard solution No. 31, the dye test with 1-butanol, solution penetration pressure, and endotherm at Tm, and the results are reported in Table 1.

Example 2

Example 1 was repeated except for replacing the fluorinated monomer with 2-(perfluorohexyl)ethyl methacrylate (Daikin Industries, Ltd.), to provide a hydrophobic porous membrane having the properties as shown in Table 1.

Example 3

Example 1 was repeated except for replacing the fluorinated monomer with 2-(perfluorodecyl)ethyl methacrylate (Daikin Industries, Ltd.), to provide a hydrophobic porous membrane having the properties shown in Table 1.

Example 4

Example 1 was repeated except for replacing the fluorinated monomer with 2-(perfluoro-5-methylhexyl)ethyl methacrylate (Daikin Industries, Ltd.), to provide a hydrophobic porous membrane having the properties as shown in Table 1.

Example 5

Example 1 was repeated except for replacing the fluorinated monomer with 2-(perfluoro-7-methyloctyl)ethyl methacrylate (Daikin Industries, Ltd.), to provide a hydrophobic porous membrane having the properties shown in Table 1.

Example 6

Example 1 was repeated except for replacing the fluorinated monomer with 2-(perfluoro-9-methyldecyl)ethyl methacrylate (Daikin Industries, Ltd.), to provide a hydrophobic porous membrane having the properties shown in Table 1.

Example 7

Example 1 was repeated except for replacing the polyolefin porous membrane with a polyethylene porous hollow fiber membrane EHF (Mitsubishi Rayon Co., Ltd.), having an i.d. of 546 μm, a membrane thickness of 112 μm, a bubble point of 4.2 kg/cm$^2$, a gas flux of 120,000 l/m$^2$·hr at 0.5 kg/cm$^2$ and a porosity of 69%, to provide a hydrophobic porous membrane having the properties as shown in Table 1.

Example 8

Example 1 was repeated except for replacing the polyolefin porous membrane with a polyethylene porous hollow fiber membrane EHF (Mitsubishi Rayon Co., ltd.), having an i.d. of 505 μm, a membrane thickness of 155 μm, a bubble point of 0.7 kg/cm$^2$, a gas flux of 1,150,000 l/m$^2$·hr at 0.5 kg/cm$^2$ and a porosity of 82%, to provide a hydrophobic porous membrane having the properties shown in Table 1.

Example 9

Example 1 was repeated except for replacing the polyolefin porous membrane with a polyethylene porous hollow fiber membrane EHF (Mitsubishi Rayon Co., ltd.), having an i.d. of 270 μm, a membrane thickness of 55 μm, a bubble point of 2.2 kg/cm$^2$, a gas flux of 270,000 l/m$^2$·hr at 0.5 kg/cm$^2$ and a porosity of 72%, to provide a hydrophobic porous membrane having the properties shown in Table 1.

Example 10

Example 1 was repeated except for replacing the polyolefin porous membrane with a polypropylene porous hollow fiber membrane KPF (Mitsubishi Rayon Co., Ltd.), having an i.d. of 200 μm, a membrane thickness of 22 μm, a bubble point of 12.5 kg/cm$^2$, a gas flux of 70,000 l/m$^2$·hr at 0.5 kg/cm$^2$ and a porosity of 50%, to provide a hydrophobic porous membrane having the properties shown in Table 1.

Example 11

Example 1 was repeated except for carrying out the heat treatment in air at 80° C. for 8 hours, to give a hydrophobic porous membrane having the properties as shown in Table 1.

Example 12

Example 1 was repeated except for carrying out the heat treatment in air at 60° C. for 24 hours, to give a hydrophobic porous membrane having the properties shown in Table 1.

Example 13

Example 1 was repeated using a polyolefin porous membrane similar to that of Example 1, except for using a solution of 19.8 parts by weight of 2-(perfluorooctyl)ethyl methacrylate (Daikin Industries, Ltd.) fluorinated monomer, 0.2 parts by weight (Mitsubishi Rayon Co., ltd.) of 1,6-hexane diol dimethacrylate crosslinking monomer, 0.2 parts by weight of polymerization initiator V-70 (Wako Pure Chemical Industries, Ltd), and 80 parts by weight of acetone to carry out a treatment similar to that of Example 1 to obtain a hydrophobic porous membrane having the properties shown in Table 1.

The porous membrane was dipped in a 30% monoethanol amine solution at 50° C. for 100 hours, followed by removing the membrane, washing it with water, drying at room temperature and evaluating in terms of the dye tests and solution penetration pressure. The results are summarized in Table 2.

Example 14

Example 13 was repeated except for replacing the fluorinated monomer with 2-(perfluorodecyl)ethyl methacrylate (Daikin Industries, Ltd.) to give the hydrophobic porous membrane having the properties shown in Tables 1 and 2.

Example 15

Example 13 was repeated except for replacing the crosslinking monomer with 1,3-butylene diol dimethacrylate (Acryester BD, a product of Mitsubishi Rayon Co., ltd.) to give a hydrophobic porous membrane having the properties shown in Tables 1 and 2.

Example 16

Example 13 was repeated except for using a solution of 19 parts by weight of 2-(perfluorooctyl)ethyl methacrylate fluorinated monomer (Daikin Industries, Ltd.), 1 part by weight (Mitsubishi Rayon Co., ltd.) of 1,6-hexane diol dimethacrylate crosslinking monomer, 0.2 parts by weight of the polymerization initiator V-70 (Wako Pure Chemical Industries, Ltd), and 80 parts by weight of acetone to obtain a hydrophobic porous membrane having the properties shown in Tables 1 and 2.

Example 17

Example 13 was repeated except for using a polyethylene porous hollow fiber membrane EHF (Mitsubishi Rayon Co., ltd.), an i.d. of 445 $\mu$m, a membrane thickness of 178 $\mu$m, a bubble point of 3.0 kg/cm$^2$, a gas flux of 150,000 l/m$^2$.hr at 0.5 kg/cm$^2$, and a porosity of 69% and using a solution of 39 parts by weight of 2-(perfluorooctyl)ethyl methacrylate (Daikin Industries, Ltd.), 1 part by weight (Mitsubishi Rayon Co., ltd.) of 1,6-hexane diol dimethacrylate crosslinking monomer, 0.4 parts by weight of polymerization initiator V-70 (Wako Pure Chemical Industries, Ltd), and 60 parts by weight of acetone to obtain a hydrophobic porous membrane having the properties shown in Tables 1 and 2.

Example 18

Example 13 was repeated except for using a polyolefin porous membrane similar to that of Example 9 and using a solution of 24.5 parts by weight of 2-(perfluorooctyl)ethyl methacrylate fluorinated monomer (Daikin Industries, Ltd.), 0.5 parts by weight (Mitsubishi Rayon Co., ltd.) of 1,6-hexane diol dimethacrylate crosslinking monomer, 0.25 parts by weight of polymerization initiator V-70 (Wako Pure Chemical Industries, Ltd), and 75 parts by weight of acetone to provide a hydrophobic porous membrane having the properties shown in Tables 1 and 2.

Example 19

A polyolefin porous membrane similar to that of Example 1 was dipped for 10 minutes in a solution obtained by dissolving 2 parts by weight of a poly-2-(perfluorooctyl)ethyl methacrylate as the fluorinated polymer component in 100 parts by weight of 1,1,2-trichloro-1,2,2-trifluoroethane followed by vaporizing off the 1,1,2-trichloro-1,2,2-trifluoroethane. This was followed by a heat treatment similar to that of Example 1 to give a hydrophobic porous membrane having the properties shown in Table 1.

Example 20

Example 1 was repeated except for replacing the polyolefin porous membrane with a polypropylene porous flat membrane, "Duraguard" 25,000 (a product of Polyplastics K.K.), having a membrane thickness of 25 $\mu$m, a bubble point of 12.1 kg/cm$^2$, a gas flux of 65,000 l/m$^2$.hr at 0.5 kg/cm$^2$, and a porosity of 45%, to provide a hydrophobic porous membrane having the properties shown in Table 1.

Comparative Example 1

Properties of a polyethylene porous membrane of Example 1 without the fluorinated polymer are shown in Table 1.

Comparative Example 2

Properties of a polyethylene porous membrane of Example 1 in which the fluorinated monomer was polymerized followed by rinsing the membrane with acetone to remove undesired components and drying at room temperature, but the polymer received no heat treatment, are shown in Table 1.

Comparative Example 3

Properties of a polyethylene porous membrane of Example 7 not holding any fluorinated polymer are shown in Table 1.

Comparative Example 4

Properties of a polyethylene porous membrane of Example 8 not holding any fluorinated polymer are shown in Table 1.

Comparative Example 5

Properties of a polyethylene porous membrane of Example 9 not holding any fluorinated polymer are shown in Table 1.

Comparative Example 6

Properties of a polyethylene porous membrane of Example 10 not holding any fluorinated polymer are shown in Table 1.

Comparative Example 7

Properties of a porous membrane of Example 19 to which the fluorinated polymer was adhered followed by subjecting it to no heat treatment are shown in Table 1.

Comparative Example 8

A polyethylene porous membrane similar to that of Example 1 was dipped in a 0.5% by weight solution of FX-13 (2-(N-ethylperfluoroalkylsulfonamide)ethyl acrylate, a product of 3M Company) in a mixed liquid of 45% by weight of tertiary butyl alcohol and 55% by weight of water, exposed while in the solution to gamma rays ($^{60}$Co) for 24 hours, and rinsed with acetone to remove any undesired components. Then, the film was heat treated for 24 hours at 80° C. in air and brought back to stand in an environment of room temperature to give a porous membrane having the properties shown in Table 1. Table 3 shows the elongations at the break and tensile strengths at the break before and after this treatment. The result demonstrates that the membrane substrate decreased in tensile properties, when compared to Example 1, indicating some damage made to the membrane substrate.

Comparative Example 9

Properties of a porous membrane of Comparative Example 1, except that it did not receive any heat treatment, are shown in Tables 1 and 3.

TABLE 3

|  | Before Treatment | | After Treatment | |
|---|---|---|---|---|
|  | Elongation at the Break (%) | Tensile at the Break (g/fil) | Elongation at the Break (%) | Tensile at the Break (g/fil) |
| Example: |  |  |  |  |
| 1 | 75 | 360 | 70 | 400 |
| Comparative Examples: |  |  |  |  |
| 8 | 75 | 360 | 40 | 270 |
| 9 | 75 | 360 | 35 | 250 |

What is claimed is:

1. A hydrophobic porous membrane comprising a polyolefin porous membrane and a polymer having a fluorinated alkyl side chains, wherein the polymer is held in physical contact with the surface of said poly-

TABLE 1

|  | Fluorinated Polymer Amount Held on Membrane (% by weight) | Solution Penetration Pressure (kg/cm$^2$)[1] | Standard Solution Dye Test[1] | 1-Butanol Dye Test[1] | Endotherm at Tm (cal/g) |
|---|---|---|---|---|---|
| Examples: |  |  |  |  |  |
| 1 | 25.5 | 3.1 | x | x | 1.7 |
| 2 | 24.0 | 2.1 | x | x | 1.8 |
| 3 | 25.1 | 3.3 | x | x | 2.0 |
| 4 | 24.8 | 2.5 | x | x | 1.8 |
| 5 | 24.7 | 3.1 | x | x | 1.6 |
| 6 | 25.0 | 3.4 | x | x | 1.9 |
| 7 | 22.5 | 4.1 | x | x | 1.6 |
| 8 | 25.9 | 0.7 | x | x | 1.7 |
| 9 | 26.7 | 1.9 | x | x | 1.7 |
| 10 | 26.5 | 8.8 | x | x | 1.7 |
| 11 | 27.5 | 3.0 | x | x | 1.4 |
| 12 | 26.9 | 3.1 | x | x | 1.6 |
| 13 | 30.1 | 3.0 | x | x | 0.8 |
| 14 | 21.2 | 3.1 | x | x | 0.7 |
| 15 | 29.8 | 3.0 | x | x | 0.8 |
| 16 | 32.3 | 2.8 | x | x | 0.5 |
| 17 | 46.0 | 3.1 | x | x | 0.7 |
| 18 | 43.0 | 0.7 | x | x | 0.6 |
| 19 | 24.8 | 3.0 | x | x | 1.7 |
| 20 | 19.5 | 8.6 | x | x | 1.7 |
| Comparative Examples: |  |  |  |  |  |
| 1 | — | 1.0 | o | o | 0 |
| 2 | 25.5 | 1.2 | x | o | 0.2 |
| 3 | — | 1.0 | o | o | 0 |
| 4 | — | 0.2 | o | o | 0 |
| 5 | — | 0.3 | o | o | 0 |
| 6 | — | 1.1 | o | o | 0 |
| 7 | 24.8 | 1.4 | x | o | 0.2 |
| 8 | 10.5 | 2.5 | x | o | 0.2 |
| 9 | 10.5 | 2.4 | x | o | 0.2 |

[1] o: dyed; x: remained undyed.

TABLE 2

|  |  | Before Dipping | | After Dipping 1,000 Hrs | |
|---|---|---|---|---|---|
|  | Amount of Fluorinated Crosslinked Polymer Held (% by weight) | 1-Butanol Dye Test (1) | Solution Penetration Pressure (kg/cm$^2$) | 1-Butanol Dye Test (1) | Solution Penetration Pressure (kg/cm$^2$) |
| Examples: |  |  |  |  |  |
| 13 | 30.1 | x | 3.0 | x | 3.0 |
| 14 | 21.2 | x | 3.1 | x | 3.1 |
| 15 | 29.8 | x | 3.0 | x | 3.0 |
| 16 | 32.3 | x | 2.8 | x | 2.8 |
| 17 | 46.0 | x | 3.1 | x | 3.1 |
| 18 | 43.0 | x | 0.7 | x | 0.7 |

(1) o: dyed; x: remained undyed.

olefin porous membrane and the fluoroalkyl side chains of said polymer are crystallized.

2. A hydrophobic porous membrane as set forth in claim 1 in which the polymer having fluorinated alkyl side chains is a polymer of a fluorinated alkyl methacrylate or a fluorinated alkyl acrylate.

3. A hydrophobic porous membrane as set forth in claim 1 in which the polymer having fluorinated alkyl side chains is a polymer of a fluorinated alkyl methacrylate or a fluorinated alkyl acrylate having at least 7, but not more than 15 carbon atoms in the ester moiety thereof.

4. A hydrophobic porous membrane as set forth in claim 1 in which the polymer having fluorinated alkyl side chains is a polymer of a perfluoroalkylethyl methacrylate or perfluoroalkylethyl acrylate having at least 7, but not more than 15 carbon atoms in the ester moiety thereof.

5. A hydrophobic porous membrane as set forth in claim 1 in which the polyolefin porous membrane is a polyethylene or polypropylene porous membrane.

6. A hydrophobic porous membrane as set forth in claim 1 in which the polyolefin porous membrane is a polyethylene hollow fiber membrane or polypropylene hollow fiber membrane.

7. A hydrophobic porous membrane as set forth in claim 1 in which the polyolefin porous membrane is a polyolefin flat membrane.

8. A hydrophobic porous membrane as set forth in claim 1 in which the polyolefin porous membrane is a polyolefin woven membrane.

9. A hydrophobic porous membrane comprising a polyolefin porous membrane and a fluorinated crosslinked polymer from a fluorinated monomer having a fluorinated alkyl side chain and a crosslinking monomer, wherein the polymer is held in physical contact with the surface of said polyolefin porous membrane and the fluorinated alkyl side chains of said fluorinated crosslinked polymer are crystallized.

10. A hydrophobic porous membrane as set forth in claim 7 in which the fluorinated monomer having a fluorinated alkyl side chain is a fluorinated alkyl methacrylate or fluorinated alkyl acrylate.

11. A hydrophobic porous membrane as set forth in claim 7 in which the fluorinated monomer having a fluorinated alkyl side chain is a fluorinated alkyl methacrylate or fluorinated alkyl acrylate having at least 7, but not more than 15, carbon atoms in the ester moiety thereof.

12. A hydrophobic porous membrane as set forth in claim 7 in which the fluorinated monomer having a fluorinated alkyl side chain is a perfluoroalkylethyl methacrylate or perfluoroalkylethyl acrylate having at least 7, but not more than 15, carbon atoms in the ester moiety thereof.

13. A hydrophobic porous membrane as set forth in claim 7 in which the crosslinking monomer is a polyfunctional methacrylate or polyfunctional acrylate.

14. A hydrophobic porous membrane as set forth in claim 7 in which the polyolefin porous membrane is a polyethylene or propylene porous membrane.

15. A hydrophobic porous membrane as set forth in claim 7 in which the polyolefin porous membrane is a polyethylene hollow fiber membrane or a polypropylene hollow fiber membrane.

16. A hydrophobic porous membrane as set forth in claim 7 in which the polyolefin porous membrane is a polyolefin flat membrane.

17. A hydrophobic porous membrane as set forth in claim 7 in which the polyolefin porous membrane is a polyolefin woven membrane.

18. A process for the manufacture of a hydrophobic porous membrane, comprising the steps of holding a polymer having fluorinated alkyl side chains in physical contact with the surface of a polyolefin porous membrane and heat treating, thereby crystallizing said fluorinated alkyl side chains.

19. A process for the manufacture of a hydrophobic porous membrane, comprising the steps of adhering a monomer having a fluorinated alkyl side chain to the surface of a polyolefin porous membrane, polymerizing in situ to hold the polymer having fluorinated alkyl side chains in physical contact with the surface of the polyolefin porous membrane, and heat treating, thereby crystallizing said fluorinated alkyl side chains.

20. A process for the manufacture of a hydrophobic porous membrane, comprising the steps holding a fluorinated crosslinked polymer from a fluorinated monomer having a fluorinated alkyl side chain and a crosslinking monomer in physical contact with the surface of a polyolefin porous membrane, and heat treating, thereby crystallizing said fluorinated alkyl side chains.

21. A process for the manufacture of a hydrophobic porous membrane, comprising the steps adhering a fluorinated monomer having a fluorinated alkyl side chain and a crosslinking monomer to the surface of a polyolefin porous membrane, polymerizing in situ to hold the fluorinated crosslinked polymer composed of the fluorinated monomer having a fluorinated alkyl side chain and the crosslinking monomer in physical contact with the surface of the polyolefin porous membrane, and heat treating, thereby crystallizing said fluorinated alkyl side chains.

* * * * *